US010863024B2

United States Patent
Robert

(10) Patent No.: US 10,863,024 B2
(45) Date of Patent: Dec. 8, 2020

(54) SYSTEM, USER EQUIPMENT, SERVER, COMPUTER PROGRAM PRODUCT AND METHOD FOR PROVIDING ACCESS TO MOBILE COMMUNICATION SERVICES

(71) Applicant: SARONIKOS TRADING AND SERVICES, UNIPESSOAL LDA, Madeira (PT)

(72) Inventor: James Robert, Hatfield (GB)

(73) Assignee: Saronikos Trading and Services, Unipessoal LDA, Madeira (PT)

( * ) Notice: Subject to any disclaimer, the term of this patent is extended or adjusted under 35 U.S.C. 154(b) by 0 days.

(21) Appl. No.: 16/336,008

(22) PCT Filed: Sep. 22, 2016

(86) PCT No.: PCT/IB2016/055672
§ 371 (c)(1),
(2) Date: Mar. 22, 2019

(87) PCT Pub. No.: WO2018/055437
PCT Pub. Date: Mar. 29, 2018

(65) Prior Publication Data
US 2020/0059555 A1    Feb. 20, 2020

(51) Int. Cl.
*H04M 3/42* (2006.01)
*H04W 76/11* (2018.01)
(Continued)

(52) U.S. Cl.
CPC ... *H04M 3/42297* (2013.01); *H04M 1/72566* (2013.01); *H04Q 3/005* (2013.01);
(Continued)

(58) Field of Classification Search
CPC ......... H04M 3/42297; H04M 1/72566; H04M 2207/18; H04W 8/183; H04W 8/22;
(Continued)

(56) References Cited

U.S. PATENT DOCUMENTS 8,983,449 B1 * 3/2015 Booth ................ H04L 65/4038
455/420
2009/0082005 A1    3/2009 Thorson et al.
(Continued)

FOREIGN PATENT DOCUMENTS

EP    0 711 090 A1    5/1996
WO    98/24257 A1    6/1998
(Continued)

OTHER PUBLICATIONS

International Search Report and Written Opinion dated Dec. 9, 2016, issued in PCT Application No. PCT/IB2016/055672, filed Sep. 22, 2016.

*Primary Examiner* — Warner Wong
(74) *Attorney, Agent, or Firm* — Workman Nydegger

(57) ABSTRACT

The invention relates to a system, an user equipment and a method for providing access to mobile communication services, allowing a user to regularly access his/her mobile services and applications through an Internet connection, but pretending to use a regular mobile device. The invention is based on an alternative user equipment equipped with a subscriber identity module to which it is associated the same telephone number as a subscriber identity module that is equipping the user's main regular mobile device, so that the alternative user equipment can access at least one communication service that is also available to the main regular mobile device.

11 Claims, 2 Drawing Sheets

(51) Int. Cl.
*H04M 1/725* (2006.01)
*H04Q 3/00* (2006.01)
*H04W 8/18* (2009.01)
*H04W 8/24* (2009.01)
*H04W 48/16* (2009.01)
*H04W 88/02* (2009.01)
*H04L 12/707* (2013.01)

(52) U.S. Cl.
CPC ............ *H04W 8/183* (2013.01); *H04W 8/245* (2013.01); *H04W 48/16* (2013.01); *H04W 76/11* (2018.02); *H04W 88/02* (2013.01); *H04L 45/22* (2013.01); *H04M 2207/18* (2013.01)

(58) Field of Classification Search
CPC ..... H04W 88/02; H04W 48/16; H04W 8/245; H04Q 3/005; H04L 45/22; H04L 47/728
See application file for complete search history.

(56) References Cited

U.S. PATENT DOCUMENTS

| | | | |
|---|---|---|---|
| 2009/0279682 A1* | 11/2009 | Strandell | H04W 8/20 379/201.02 |
| 2013/0288750 A1* | 10/2013 | Itoh | H04L 12/2856 455/558 |
| 2016/0036476 A1* | 2/2016 | Cho | H04M 3/54 455/558 |
| 2016/0135139 A1* | 5/2016 | Jahangir | H04L 65/1016 455/435.1 |

FOREIGN PATENT DOCUMENTS

| | | | | |
|---|---|---|---|---|
| WO | 2013/093574 A1 | 6/2013 | | |
| WO | WO-2018055437 A1 * | 3/2018 | | H04Q 3/005 |

* cited by examiner

SYSTEM, USER EQUIPMENT, SERVER, COMPUTER PROGRAM PRODUCT AND METHOD FOR PROVIDING ACCESS TO MOBILE COMMUNICATION SERVICES

FIELD OF THE INVENTION

The invention relates to a communication system, an user equipment, server, computer program product and a method for providing access to mobile communication services such as voice call, SMS, instant messaging or the like; in particular, said communication system allows a user to access the subscribed mobile communication services and applications remotely through a communication network such as Internet.

DESCRIPTION OF PRIOR ART

It may happen that a cellular user, who is travelling, looses the possibility to access his/her mobile services and applications because of poor radio coverage or mobile network faults, or because the handset has not sufficient energy, or is lost or stolen, or the like, while an Internet connection is available. Through Internet and other communications networks one can access a number of communication services, but not all mobile services and applications. For instance, one cannot check WhatsApp messages, call somebody from his phone book by showing his/her mobile telephone number as caller id, or the like.

The availability of what people can do with their handsets or tablets is ever increasing, therefore there is a need to overcome these deficiencies.

SUMMARY OF THE INVENTION

The present invention aims to solve these and other problems by providing a system, an user equipment, and a method for providing access to mobile communication services.

The present invention teaches how to embody the relevant systems and apparatuses, allowing at least a user to access his/her subscribed mobile services and applications through an Internet connection, by simulating the usage of his/her regular mobile device (main user equipment).

The main idea of the present invention is based on an user equipment that may be kept in a safe location (e.g. at home, in a server farm, or the like), and comprises the following parts:
a mobile interface for accessing a mobile network providing mobile communication services;
a communication interface in communication with a communication network for allowing remote control of said second user equipment;
a subscriber identity module for giving access to said mobile network, and configured to be associated to a telephone number that is also associated to a further subscriber identity module of a main user equipment;
processing means (not shown in the attached drawings) configured for performing the following steps:
receiving, through the communication interface, control information which can be generated by a terminal device;
generating data on the basis of said received control information, and transmitting said data through said mobile interface;
acquiring audio and/or visual information generated during the operation of the processing means and/or the mobile interface;
transmitting, through said communication interface, said audio and/or visual information.

In this way, the user equipment can access at least a communication service that is also available to the main user equipment. This increases the accessibility to the mobile services over the prior art, because the invention provides to the user two or more ways to access a mobile network, and at least one of them can be available even if the user is far away from said safe location.

In addition the present invention teaches how to embody a server, allowing at least a user to access his/her subscribed mobile services and applications through an Internet connection, by simulating the usage of his/her regular mobile device (main user equipment).

Moreover the present invention teaches how to embody a computer program product, allowing at least a user to access his/her subscribed mobile services and applications through an Internet connection, by simulating the usage of his/her regular mobile device (main user equipment). It is clear that said computer program product is adapted to be loaded partially or wholly to one of the elements of the communication system on the user side or provider side according based on the present invention.

Further advantageous features of the present invention are the subject of the attached claims.

BRIEF DESCRIPTION OF DRAWING

The features of the invention are specifically set forth in the claims annexed to this description; such characteristics will be clearer from the following description of a preferred and non-exclusive embodiment that is shown in annexed drawings, wherein.

DETAILED DESCRIPTION OF THE INVENTION

In this description, any reference to "an embodiment" will indicate that a particular configuration, structure or feature, described in regard to the implementation of the invention, is comprised in at least one embodiment. Therefore, the phrase "in an embodiment" and other similar phrases, which may be present in different parts of this description, will not necessarily be all related to the same embodiment. Furthermore, any particular configuration, structure or feature may be combined in one or more embodiments in any way deemed appropriate. The references below are therefore used only for simplicity's sake, and do not limit the protection scope or extension of the various embodiments.

The invention is based on two apparatuses: a Main User Equipment and an Alternative User Equipment. Both of them are adapted to access a mobile communications network using the same credentials.

Typically the Main User Equipment is a smartphone that the user regularly carries and uses for his/her communications needs when he/she is travelling.

The Alternative User Equipment may be an ad-hoc apparatus (i.e. a specifically designed apparatus) or an apparatus similar to the Main User Equipment or even of the same type as the Main User Equipment. Said Alternative User Equipment is preferably held in a safe place, such as the user's home or other trusted premises.

Through a communication interface or a suitable connection interface, the Alternative User Equipment is connected to a communication network, such as Internet or like, so that it can transmit and receive data flows and commands to and from remote locations.

When the user needs to access the mobile communications network while his/her Main User Equipment is out of order for some reason, the user can access the Alternative User Equipment through Internet, and then he/she can access the mobile communications network, and the relevant services, as if he/she would use his/her Main User Equipment.

Possible embodiments of the invention are given in the following description also with reference to the annexed figures.

Figure 1:
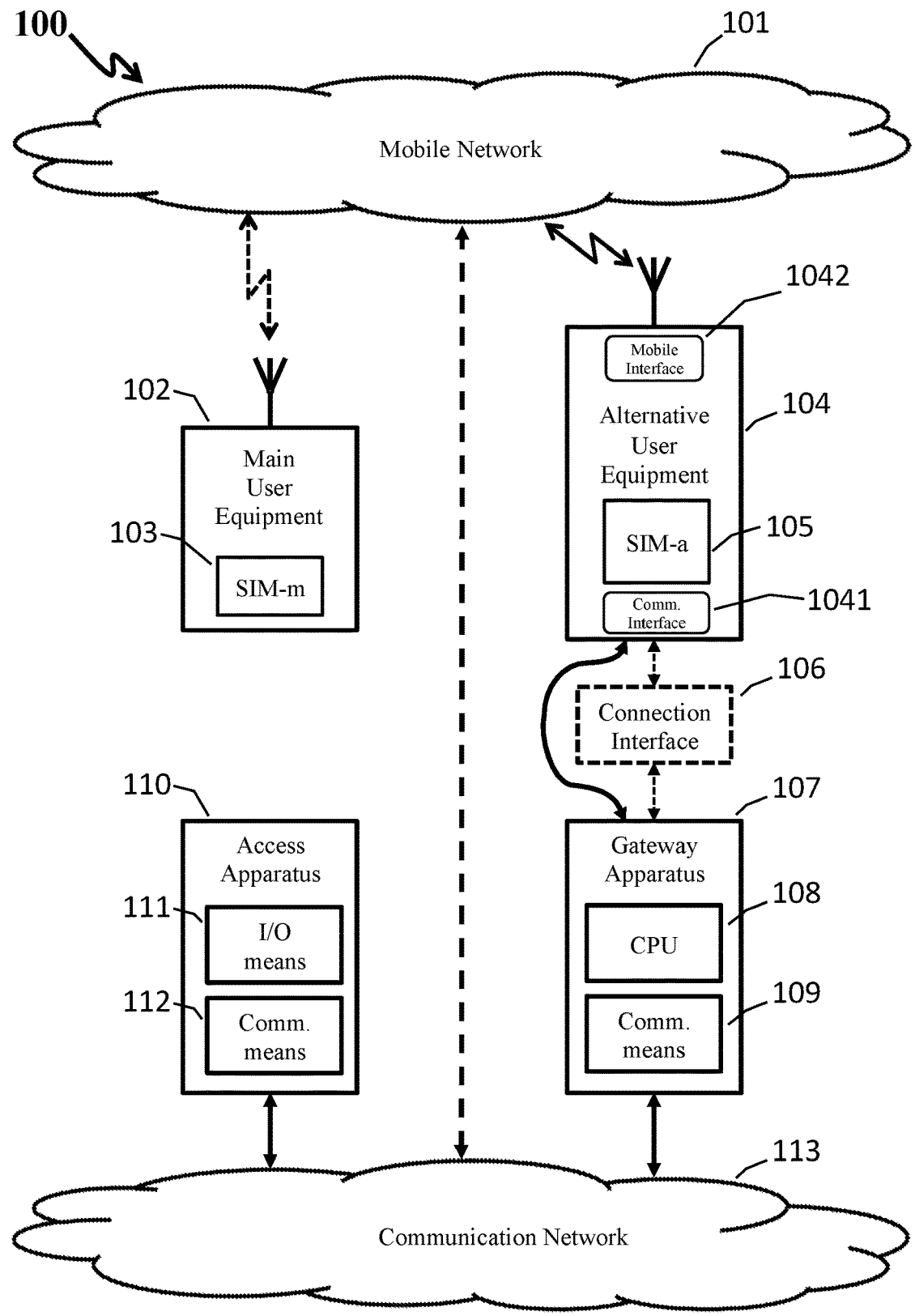
FIG. 1 shows a system to access a mobile communication network according to the invention.

FIG. 1 illustrates the preferred embodiment of the communication system 100 that comprises the following parts:
- a mobile network 101 for providing mobile communication services, which typically is a cellular network, such as a GSM network, a CDMA network, a UMTS Network, an LTE network, a network combining a number of 3GPP technologies, or other types of mobile networks;
- a main user equipment 102 (e.g. a mobile phone, a smartphone, a tablet, a wearable device such as a smartwatch, smart-glasses, or the like) that the user regularly utilizes to access the mobile network 101 and relevant applications; such main user equipment 102 comprises a first identification module 103, such as a SIM (Subscriber Identification Module), a CSIM (CDMA Subscriber Identification Module), a USIM (UMTS Subscriber Identification Module), an ISIM (IP Multimedia Service Identity Module), or other kinds of identification modules; for the sake of brevity, this identification module is called SIM-m;
- at least one alternative user equipment 104 (e.g. a second mobile phone, a smartphone, an expressly designed transceiver, or the like) which is preferably kept in a safe location (e.g. at user's home, in a server farm, or the like), and is configured for accessing at least one communication service or application as the main user equipment 102;
- a gateway apparatus 107 (e.g. a general-purpose computers PC, a router, or the like), comprising elaboration means 108 (e.g. a CPU, GPU, FPGA, CPLD, or the like) and communications means 109 configured for allowing connections to and from a communication network 113, preferably by means of security procedures. In particular, with a security procedure for getting access to the mobile network 101 through the alternative user equipment 104; such gateway apparatus 107 is also configured to implement protocols and formats for the transport of information such as data flows like audio and/or visual information, e.g. audio and/or video stream produced during the operation of said alternative user equipment 104), commands or the like; said gateway apparatus 107 is configured for interfacing the alternative user equipment 104 with the communication network 113;
- a communication network 113, typically Internet, through which the gateway apparatus 107 can exchange data and commands with an access apparatus 110;
- the access apparatus 110 (e.g. a general-purpose computers PC, a tablet, or the like), also referred as 'terminal device') comprises input/output means 111 apt to present audio and/or visual information (e.g. by means of an audio adapter and/or a video adapter) and acquire control information (e.g. by means of one or more human device interfaces such as keyboard, mouse, or the like), and first communication means 112 configured to access the communication network 113 and to interact with the gateway apparatus 107.

More in details, the alternative user equipment 104 comprises the following parts:
- a communication interface 1041 for allowing remote control of said second user equipment 104; said communication interface may be an adapter according to at least one of the following standards: USB, Firewire, RS232, IEEE 1284, Ethernet, Wi-Fi, I2C, or similar);
- a mobile interface 1042 for accessing to a mobile network 101 providing said mobile communication services;
- a second identification module 105, called SIM-a, which is similar to said first identification module 103 (SIM-m), and has associated the same mobile telephone number as that of SIM-m 103;
- processing means (not shown in the attached drawings) in communication with said interfaces 1041, 1042 and said subscriber identity module 105.

When the different parts of the system are in an operating condition, each part repeats a sequence of steps which will be described below.

The processing means of the user equipment 104 are configured for performing the following tasks:
- receiving, through said communication interface 1041, control information which can be generated by the terminal device 110;
- generating data on the basis of said received control information (e.g. generating a dialing sequence, preparing an SMS messages, preparing packets to be send to a particular APN of the mobile network 101, or the like), and transmitting said data through said mobile interface 1042;
- acquiring audio and/or visual information generated during the operation of the processing means and/or the mobile interface 1042, e.g. recording the audio and/or video stream of a call, storing packets received from the APN, or the like;
- transmitting, through said communication interface 1041, said audio and/or visual information, preferably to the terminal device 110.

The gateway apparatus 107 comprises the following elements:
- second communication means 109 adapted to access said communication network 113, and to establish a (secure) connection with said terminal device 110 for transmitting and receiving data over said (secure) connection;
- elaboration means 108 in communication with said second communication means 109.

More in details, the elaboration means 108 are configured for executing a set of instructions that performs the following steps:
- receiving said output information or said audio and/or visual information from said communication interface 1041;
- translating (optionally) said output information into said audio and/or visual information, e.g. by encapsulating them in a sequence of TCP packets;
- transmitting said audio and/or visual information to the terminal device 110 by means of said second communication means 109 (e.g. an Ethernet or WiFi interface or the like).

Furthermore, the elaboration means 108 are also configured for executing a further set of instructions that performs the following steps:

- receiving control information (e.g. commands imparted by the user through the terminal 110) from said terminal device 110 through the second communication means 109;
- translating (optionally) said control information received from said terminal device 110 into input information for said communication interface 1041, e.g. by reconstructing the data contained in a set or received TCP packets;
- transmitting said input information or said control information to said interface 1041 to the communication interface 1041, e.g. by means of a digital interface using a communication protocol like I²C, USB, or the like.

The terminal device 110 is configured for executing the following steps:

- establishing, through the first communication means 112 (e.g. an Ethernet or WiFi interface or the like), a connection with said gateway apparatus 107, preferably by means of a secure login procedure;
- generating said control information for said second user equipment 104 and transmitting them through said connection;
- receiving the audio and/or visual information through said connection and presenting them by means of the input/output means 112.

The mobile network 101 and the communication network 113 may be interconnected (dashed line in FIG. 1) for implementing advanced features that are illustrated along this description. Anyway those two networks are usually interconnected for other purposes, as communication network 113 is typically Internet, which is usually available through any cellular network.

SIM-m and SIM-a correspond to the same telephone number, as said above, similarly to the case of the service offered by mobile network operators called "Double" service, or SIMs Twins, or SIM Bis, or other commercial names, that offers the user the ability to have, for instance, a SIM in a mobile phone and a SIM twin in a car phone with the same telephone number.

The basic idea of the invention is in fact allowing the user to access the mobile network 101 through the communication chain that starts from the access apparatus 110 and comprises the alternative user equipment 104, by making it possible for the user to simulate an access to the mobile network 101 by means of its main user equipment 102, while instead he/she is not using it. The user's benefits are the accessibility to communication services (e.g. phone calls), messages (e.g., WhatsApp messages, SMSs, MMSs, etc.), and applications without using his/her main user equipment 102, since it may unable to establish a direct connection with said mobile network 101.

As SIM-m and SIM-a correspond to the same telephone number, only one of them can be active at a time. In fact, if one of them is active, the mobile network 101 rejects any access attempt by other SIMs corresponding to the same telephone number; hence, the main user equipment 102 and the alternative user equipment 104 cannot communicate to each other through the mobile network 101, but only through the communication network 113. This is useful for aligning data and applications (also referred as 'service access data') of the user equipment. An example in which the 'service access data' are used is when the user updates a contact in the phone book of the main user equipment 102. When this occurs, the same update is immediately reproduced by the alternative user equipment 104. This can be done by means of a message automatically sent from the main user equipment 102 to the alternative user equipment 104, through the path that includes the connection between the mobile network 101 and the communication network 113. In other words, the main user equipment 102 and the alternative user equipment 104 are configured for synchronizing the service access data (e.g. contacts, credentials, SMS, Instant messages, or the like) of the user equipment 104 preferably through a path including the mobile network 101 and the communication network 113.

This ensures that the user can increase the possibility of accessing the mobile networks service, since the user can easily recover the information for accessing the services in case the main user equipment fails or is no more accessible (e.g. because it has been damaged, stolen, or the like).

The communication system 100 may also comprise a connection interface 106 configured for adapting inputs and outputs of the alternative user equipment 104 to inputs and outputs of a gateway apparatus 107. In fact, some alternative user equipment (e.g. the handsets running iOS as operating system) does not allow the full control by USB interface, or by means of the user's voice, and for some operations they requires pressing a key or touching the screen. In order to solve this issue, the connection interface 106 may comprise suitable mechanical tools (e.g. a robotic hand, a movable elongated body moved by actuators so as to act as a finger, or the like) remotely controllable (e.g. by the mouse of connected to the access apparatus 110) adapted to activate the communication interface 1041 which may comprise human device interface such as buttons, a touch screen, or the like. This makes the connection interface 106 more complex, but the skilled person knows how to implement it. In this way, the accessibility to the mobile services is further improved because a larger quantity of alternative user equipment can be used for implementing the invention.

More in details, the connection interface 106 is in communication with the communication interface 1041 of second user equipment 104 and with said gateway apparatus 107.

When the connection interface 106 is in a operating condition, it is configured for performing the following steps:

- acquiring equipment output data produced by said second user equipment 104 (e.g. digital streams, audio and/or video output perceptible by humans through a camera and/or a microphone, or the like), preferably during the operation of said user equipment;
- adapting said equipment output data into output information which is comprised in the audio and/or visual information, so as said data can be transmitted, e.g. by encapsulating said information into an encoded MPEG stream, a stream of TCP packet, or the like;
- sending said output information to the gateway apparatus 107, e.g. by means of an adapted supporting one or more of the following communication standards: USB, Firewire, RS232, IEEE 1284, Ethernet, Wi-Fi, I²C, or the like.

Furthermore, said connection interface 106 is also configured for performing the following steps:

- receiving the input information from said gateway apparatus 107, e.g. by means of the digital interface;
- translating said input information into at least a user equipment command (e.g. by interpreting a string written in a particular language) or a datum sent to said second user equipment 104 (e.g. by decoding an MPEG encoded stream) which is comprised in the control information;

sending said command or datum to said second user equipment 104 through the communication interface 1041, e.g. by using the proper input means which will be better described in what follows in this description.

Considering that a number of handsets have applications allowing full operation by voice, that is to give instructions, place calls, send text messages, dictate emails, play music and more, just by speaking to the handset, the connection interface 106 may comprise a cradle to hold the device, a camera to film the device screen, and a connection to the audio jack of the device to receive and send sounds from and to the device. With these components the skilled person knows how to display the screen of the handset on the screen of the access apparatus 110 and to transfer data and commands in both directions. Thus, with the access apparatus 110 the user may be able to see the screen of the handset and to control it by voice.

The skilled person also knows that, in the practical implementation of the invention, depending on the particular embodiment and characteristics of the devices selected for the implementation, the elements identified in FIG. 1 by labels 104 to 109 can be grouped in a number of different ways. For instance, the alternative user equipment 104 (comprising the SIM-a 105) of the main embodiment can be an expressly designed transceiver, or modem, that works as a standard cellular device, but, instead of getting inputs from keys, touchscreens, microphones, cameras, and connectors, and instead of providing outputs to screens, loudspeakers, and connectors, it gets inputs, and provides outputs through connectors, so that input and outputs can be managed by the gateway apparatus 107 through a tailored connection interface 106.

Figure 2:
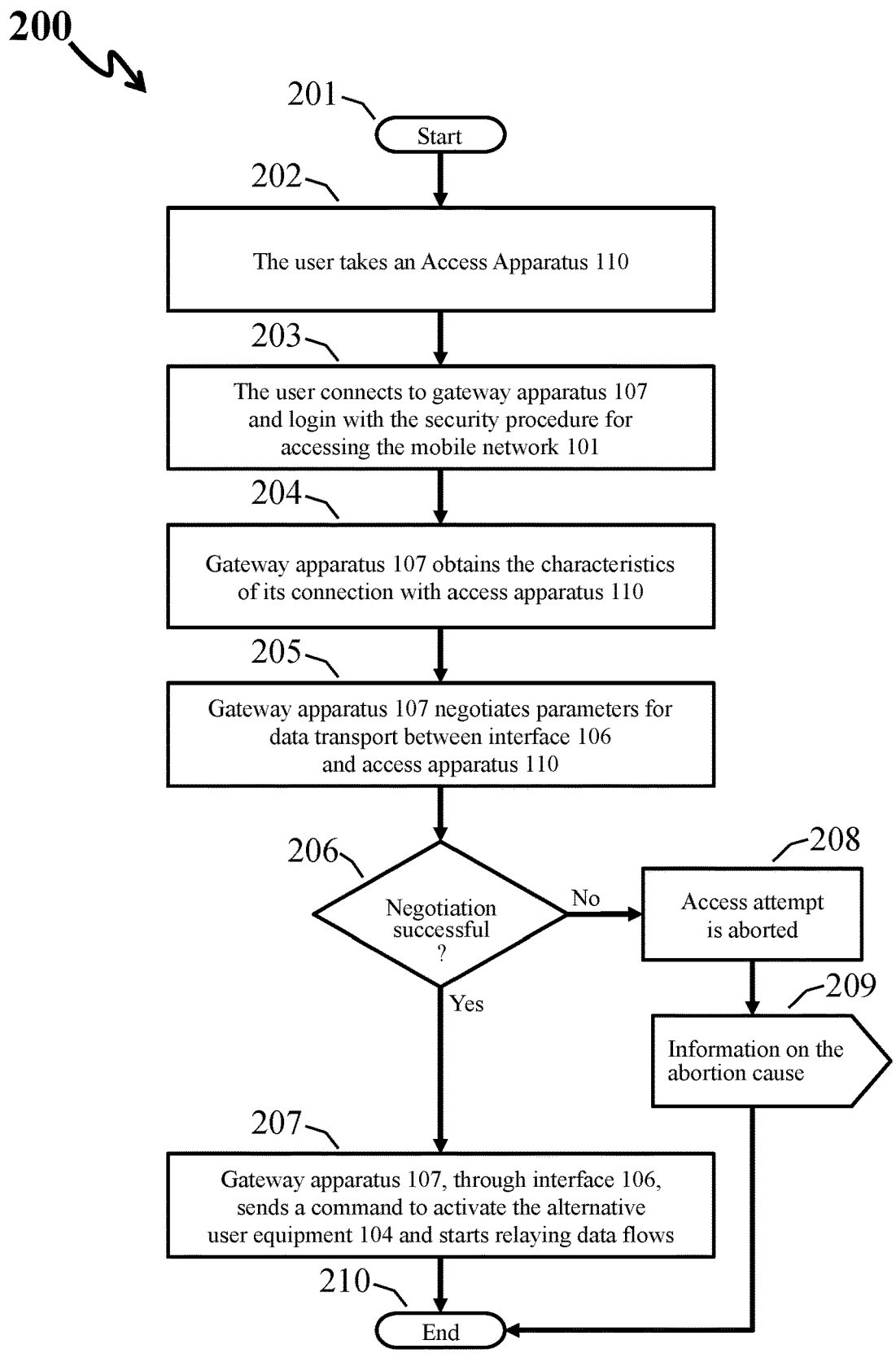
FIG. 2 shows a flow chart depicting the process for accessing a mobile communication network through an alternative user equipment, according to the invention.

In all the previously described embodiments, the process for accessing the mobile network, through the access apparatus 110 and the alternative user equipment 104, comprises the following steps, which are now described also with reference to FIG. 2:

201 start of process, occurring when the user decides to utilize the alternative user equipment 104 to access the mobile network 101, assuming that the main user equipment 102 is not connected to the mobile network 101;

202 the user takes an access apparatus 110 suitable to access the communication network 113;

203 through communication network 113, the user connects to gateway apparatus 107 and preferably login with the security procedure for accessing the mobile network 101;

204 the gateway apparatus 107 obtains the characteristics of its connection with access apparatus 110 (including communication network 113) and, possibly, prompting the user for some inputs regarding the characteristics of the access apparatus that he/she wants to use (e.g., screen resolution) and its connection to the network (e.g., WiFi, RS232);

205 the gateway apparatus 107 negotiates parameters for the data transport between the connection interface 106 and access apparatus 110;

206 the gateway apparatus 107 determines if the above negotiation is successful: if it is, the process continues to step 207, otherwise it continues to step 208;

207 the gateway apparatus 107, through the connection interface 106, sends a command to activate the alternative user equipment 104 and starts relaying data flows through the established connection between the access apparatus 110 and the alternative user equipment 104, thus allowing the user to access the mobile network 101 (e.g., to place a call, send an SMS, or the like); then the user can continue to exchange data with the mobile network 101, until he decides to close the established connection to it. When the process to access the mobile network 101 terminates, the process goes to the end 210;

208 the gateway apparatus 107 aborts the access attempt and

209 send the abortion cause to the access apparatus 110;

210 end of the process to access the mobile network 101.

It is to be evidenced that establishing connection to the alternative user equipment 104 allows the user not only to access the mobile network 101, but also to access data and applications residing on that apparatus.

Summarizing, a method for providing access to mobile communication services such as voice call, SMS, instant messaging, or the like, comprises the following phases:

a receiving phase, wherein control information, which can be generated by the terminal device 110, is received through a communication interface 1041 of a user equipment 104 associated to a telephone number that is also associated to another user equipment 102;

a first data forwarding phase, wherein data are generated, by means of the processing means, on the basis of said received control information, and transmitted, by means of said user equipment, to the mobile network 101;

a second data forwarding phase, wherein audio and/or visual information generated during the operation of the user equipment 104 are transmitted, through said communication interface 1041, to the terminal device 110.

In a second embodiment of the invention, an alternative user equipment, which has similar technical features and functionalities of the alternative user equipment 104 described for the main embodiment, is a regular user equipment (e.g. a smartphone, a tablet, or another kind of mobile device) that can be patched/programmed to redirect inputs and outputs through suitable means (screen mirroring patches and the like). In other words, the alternative user equipment comprises the gateway apparatus, so that said alternative user equipment is able to communicate (on its own) with the terminal device 110 through the communication network 113.

The patch (also referred as 'application') comprises a set of instructions for coding the audio-visual information, which is intended for the output means of the alternative user equipment (screens, loudspeakers, and the like), into data flows that can be transmitted over physical connections or wireless connections, such as USB, Wi-Fi, 3G or LTE, and the like, so that those data can be transmitted to the terminal 110 by means of the communication network 113. Furthermore, the patch also provides another set of instruction for decoding the data flows, which are received through the same transmission means, into commands for the alternative user equipment 104 and into audio-visual information that can be transmitted by, the alternative user equipment, through the mobile network 101. This will allow an end-user with only a general knowledge about mobile devices to manage settings and applications on the alternative user equipment. In this way, the accessibility to the mobile services is further improved because using a regular device like a smartphone or a tablet makes it possible to recover a large quantity of information since the level of integration of the components results increased.

In a third embodiment of the invention, the first user equipment (which comprises the same technical features of the first user equipment 102 described for the two previous embodiments) comprises the terminal device 110, i.e. the first user equipment 102 may be a smartphone, a tablet, or the like. In this way, the accessibility to the mobile services is further improved because the invention can be implemented without using a dedicated terminal 110 which is not usually carried around by the user.

Furthermore, the first user equipment 102 may be configured for accessing at least one communication service through the alternative user equipment 104 (via the terminal device comprised into it) when the first user equipment 102 is unable to access said at least one communication services provided by the mobile network 101. In this way, it is possible to increase the possibility to access mobile communication services also when the user is in a place in which the mobile network 101 cannot be accessed but the communication network 113 is available (e.g. in a basement or the like).

Such kind of arrangement provides a high degree of flexibility and allows the user to fully mirror his/her main user equipment 102 in the alternative user equipment 104.

With the above-described embodiments of the invention, and others that the skilled person can devise, a mobile user can access his/her cellular services and applications through Internet and do what one can do with a regular handset directly connected to a cellular network.

The present description has tackled some of the possible variants, but it will be apparent to the man skilled in the art that other embodiments may also be implemented, wherein some elements may be replaced with other technically equivalent elements. The present invention is not therefore limited to the explanatory examples described herein, but may be subject to many modifications, improvements or replacements of equivalent parts and elements without departing from the basic inventive idea, as set out in the following claims.

The invention claimed is:

1. A communication system for providing access to mobile communication services, voice call, SMS, instant messaging, or the like, comprising:
   a mobile network for providing said mobile communication services;
   a communication network for providing data communication services;
   a first user equipment configured for accessing said mobile network; and comprising a first subscriber identity module adapted to give access to said mobile network;
   a second user equipment configured for accessing said mobile network, comprising a second subscriber identity module adapted to give access to said mobile network, and a communication interface for:
      receiving control information for remote controlling said second user equipment; and
      transmitting audio and/or visual information generated during the operation of said second user equipment;
   a terminal device comprising first communication means adapted to access said communication network, and input/output means adapted to present the audio and/or visual information and acquire control information;
   a gateway apparatus configured for allowing communications between said terminal device and said second user equipment through the communication network, wherein the terminal device is configured for:
   a. establishing, through the first communication means, a connection with said communication interface of the second user equipment via said gateway apparatus;
   b. transmitting, through said connection, said control information to the second user equipment; and
   c. receiving the audio and/or visual information through said connection, and presenting said audio and/or visual information by means of the input/output means, wherein the first subscriber identity module and the second subscriber identity module are associated to a same telephone number, enabling the second user equipment to access at least one communication service which is also available to the first user equipment and wherein said communication network is the Internet, through which said gateway apparatus exchanges data and commands with said terminal device.

2. The communication system according to claim 1, wherein the second user equipment comprises the gateway apparatus.

3. The communication system according to claim 1, comprising a connection interface in communication with the gateway apparatus and with the communication interface of said second user equipment, wherein the audio and/or visual information comprises output information, and the control information comprises at least a user equipment command and/or data sent to said second user equipment, wherein the connection interface is configured for:
   a. acquiring equipment output data produced by said second user equipment, adapting said equipment output data into the output information which can be transmitted, and sending said output information to the gateway apparatus;
   b. receiving input information from said gateway apparatus, translating said input information into said at least one user equipment command and/or data sent to said second user equipment, and sending said command and/or data to said second user equipment.

4. The communication system according to claim 1, wherein first user equipment comprises the terminal device.

5. The communication system according to claim 4, wherein the first user equipment is configured for accessing at least one communication service through the second user equipment via the terminal device when said first user equipment is unable to access said at least one communication services provided by the mobile network.

6. The communication system according to claim 1, wherein the first and the second user equipment are configured for synchronizing service access data between them through the communication network.

7. The communication system according to claim 1 further comprising:
   a user equipment comprising:
      a mobile interface for accessing to said mobile network providing said mobile communication services;
      a communication interface for allowing remote control of said second user equipment, wherein said communication interface is in communication with a communication network;
      a subscriber identity module for giving access to said mobile network; and
      processing means in communication with said communication interface and said mobile interface and said subscriber identity module, wherein said processing means are configured for:
      receiving, through said communication interface, control information which can be generated by a terminal device;
      generating data on the basis of said received control information, and transmitting said data through said mobile interface;

acquiring audio and/or visual information generated during the operation of the processing means and/or the mobile interface;

transmitting, through said communication interface, said audio and/or visual information;

and wherein said subscriber identity module is configured to be associated to a telephone number that is also associated to a further subscriber identity module of another user equipment, so that said user equipment can access at least one communication service which is also available to said another user equipment.

8. The communication system of claim 1, further comprising a server prepared to be used in said communication system.

9. A method for providing access to mobile communication services such as voice call, SMS, instant messaging, or the like, the method comprising:

a receiving phase, wherein control information, which can be generated by a terminal device, said terminal device comprising a first communication means adapted to access a communication network and input/output means adapted to present audio and/or visual information and acquire control information, are received through a communication interface of a user equipment associated to a telephone number that is also associated to another user equipment enabling said another user equipment to access at least one communication service which is also available to the user equipment, wherein said another user equipment is configured for accessing a mobile network using another subscriber identity module to give access to said mobile network, the control information for remote controlling said user equipment and transmitting audio and/or visual information generated during the operation of said user equipment;

a first data forwarding phase, wherein data are generated, by means of processing means, on the basis of said received control information, and transmitted, by means of said user equipment, to said mobile network; and a second data forwarding phase, wherein audio and/or visual information generated during the operation of the user equipment are transmitted, through said communication interface, through a gateway apparatus configured for allowing communications between said terminal device and said user equipment through a communication comprising the Internet, to the terminal device.

10. The communication system of claim 1, further comprising a computer program product which can be loaded into the memory of an electronic computer or said user equipment or a server or one of the elements of said communication systems which comprises portions of software code for providing access to mobile communication services such as voice call, SMS, instant messaging, or the like.

11. A non-transitory computer-readable medium with instructions thereon, that when executed by a processor, perform the following:

a receiving phase, wherein control information, which can be generated by a terminal device, said terminal device comprising a first communication means adapted to access a communication network and input/output means adapted to present audio and/or visual information and acquire control information, are received through a communication interface of a user equipment associated to a telephone number that is also associated to another user equipment enabling said another user equipment to access at least one communication service which is also available to the user equipment, wherein said another user equipment is configured for accessing a mobile network using another subscriber identity module to give access to said mobile network, the control information for remote controlling said user equipment and transmitting audio and/or visual information generated during the operation of said user equipment;

a first data forwarding phase, wherein data are generated, by means of processing means, on the basis of said received control information, and transmitted, by means of said user equipment, to said mobile network; and a second data forwarding phase, wherein audio and/or visual information generated during the operation of the user equipment are transmitted, through said communication interface, through a gateway apparatus configured for allowing communications between said terminal device and said user equipment through a communication comprising the Internet, to the terminal device.

* * * * *